United States Patent
Lemmers, Jr.

(10) Patent No.: US 9,863,544 B2
(45) Date of Patent: Jan. 9, 2018

(54) PRESSURE-REGULATING VALVES

(71) Applicant: Hamilton Sundstrand Corporation, Charlotte, NC (US)

(72) Inventor: Glenn C. Lemmers, Jr., Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 497 days.

(21) Appl. No.: 14/524,146

(22) Filed: Oct. 27, 2014

(65) Prior Publication Data

US 2016/0116074 A1    Apr. 28, 2016

(51) Int. Cl.
*H02K 9/00*   (2006.01)
*F16K 11/07*  (2006.01)
*H02K 9/19*   (2006.01)
*G05D 16/10*  (2006.01)
*F01P 7/14*   (2006.01)

(52) U.S. Cl.
CPC .............. *F16K 11/07* (2013.01); *G05D 16/10* (2013.01); *H02K 9/19* (2013.01); *F01P 2007/146* (2013.01)

(58) Field of Classification Search
CPC .......... H02K 9/19; F16K 11/07; G05D 16/10; G05D 16/18
USPC .................................. 310/54; 251/324, 325
See application file for complete search history.

(56) References Cited

U.S. PATENT DOCUMENTS

| | | | |
|---|---|---|---|
| 3,736,958 A * | 6/1973 | Rostad | F16K 11/07 137/625.6 |
| 4,279,268 A | 7/1981 | Aubert | |
| 2009/0145495 A1* | 6/2009 | Pfeiffer | G05D 16/10 137/505.39 |
| 2010/0283333 A1 | 11/2010 | Lemmers, Jr. et al. | |
| 2011/0180741 A1* | 7/2011 | Lockhart | E03C 1/0408 251/324 |
| 2014/0109979 A1 | 4/2014 | Rickis et al. | |
| 2015/0068620 A1* | 3/2015 | Lemmers, Jr. | G05D 16/10 137/492.5 |

OTHER PUBLICATIONS

Extended European Search Report in European counterpart Application No. 15191518.8 dated Apr. 1, 2016.

* cited by examiner

*Primary Examiner* — Hanh Nguyen
(74) *Attorney, Agent, or Firm* — Locke Lorde LLP; Scott D. Wofsy; Christopher J. Cillié

(57) ABSTRACT

A pressure-regulating valve assembly includes a sleeve body and a spool. The sleeve body has an interior surface and a sense port. The spool has an external surface and is slideably received within the sleeve body such that the external spool surface and the sleeve body interior surface define therebetween a plurality of sleeve body chambers. A first of the sleeve body interior chambers is a deadheaded chamber in fluid communication with the environment external to the sleeve body through the sense port for controlling pressure of fluid traversing the pressure-regulating valve assembly.

14 Claims, 4 Drawing Sheets under consideration. For purpose of explanation and illustration, and not limitation, a partial view of an exemplary embodiment of a pressure-regulating valve in accordance with the disclosure is shown in FIG. 1 and is designated generally by reference character 100. Other embodiments of pressure-regulating valves in accordance with the disclosure, or aspects thereof, are provided in FIGS. 2-4, as will be described. The systems and methods described herein can be used for regulating coolant flow pressure to generators, such as aircraft electrical generators.

PRESSURE-REGULATING VALVES

BACKGROUND OF THE INVENTION

1. Field of the Invention

The present disclosure relates to pressure-regulating valves, and more particularly to pressure-regulating valves for electrical generators.

2. Description of Related Art

Aircraft commonly include generators for providing electricity to electrically powered devices disposed in the aircraft. The generators typically include a rotor coupled to an engine and rotatable with respect to a stator. Rotation of the rotor induces a current flow in windings carried by either the rotor or the stator and generating heat through resistive heating. In some types of generators, heat generated by the current flow is removed by flowing liquid coolant through the generator, typically through a pressure-regulating valve that maintains the coolant flow pressure within a predetermined pressure range.

Conventional pressure-regulating valves typically include a movable member positioned within the coolant flow and movable in response to pressure change in the coolant flow. The movable element is generally operable to reduce or increase the coolant flow through the valve in respect to pressure change in coolant provided to the pressure-regulating valve, thereby providing a coolant flow with uniform flow pressure to the generator. In some types of pressure-regulating valves, movement of the movable element can also be influenced by factors other than coolant pressure, such as temperature, entrained air, or vibration, impacting coolant pressure.

Such conventional systems and methods have generally been considered satisfactory for their intended purpose. However, there is still a need in the art for improved pressure-regulating valves. The present disclosure provides a solution for this need.

SUMMARY OF THE INVENTION

A pressure-regulating valve assembly includes a sleeve body and a spool. The sleeve body has an interior surface and a sense port. The spool has an external surface and is slideably received within the sleeve body such that the external spool surface and the sleeve body interior surface define therebetween a plurality of sleeve body chambers. A first of the sleeve body interior chambers is a deadheaded chamber in fluid communication with the environment external to the sleeve body through the sense port for controlling pressure of fluid traversing the pressure-regulating valve assembly.

In certain embodiments, the deadheaded chamber can be a first deadheaded chamber and the sleeve body can define within its interior a second deadheaded chamber. A flow-throttling chamber can be defined within the sleeve body and disposed between the first deadheaded chamber and the second deadheaded chamber. The second deadheaded chamber can be in fluid communication with the environment external to the sleeve body through a lubricant orifice. The spool can fluidly isolate the first deadheaded chamber from the second deadheaded chamber, thereby preventing fluid communication therebetween. It is also contemplated that the spool can fluidly isolate the flow-throttling chamber from either or both of the first deadheaded chamber and the second deadheaded chamber.

In certain embodiments, the spool can include a disk portion. The disk portion can extend from an axis centrally disposed in the bore to the sleeve body interior surface. The disk portion can bound a portion of the deadheaded chamber, e.g. the first deadheaded chamber, on a side of the chamber opposite the sense port. A screen can be disposed between the sense port and the environment external to the sleeve body. A keeper can also be seated over a periphery of the screen on a side of the screen opposite the sleeve body. A retaining ring can also be seated over the screen on a side of the screen opposite the sleeve body.

It is contemplated that, in accordance with certain embodiments, the sense port can be defined by a flange extending inward from the sleeve body. The flange can also extend radially inward from the sleeve body and define a periphery of the sense port. The sense port can define a cylindrical flow area extending along the axis of the sleeve body. The reference orifice can have a width of between about 0.010 inches (0.025 centimeters) and about 0.020 inches (0.050 centimeters), such as a diameter of about 0.015 inches (0.038 centimeters) for example.

An electrical machine includes windings and a pressure-regulating valve assembly. The pressure-regulating valve assembly includes a sleeve body and a spool. The sleeve body has a sense port and an interior surface. The spool has an exterior surface and is slideably received within the sleeve body such that the spool surface and the sleeve body interior surface define a plurality of sleeve chambers including a first deadheaded chamber in fluid communication with the external environment through the sense port, a flow-throttling chamber adjacent to the first deadhead chamber and in fluid communication with electrical machine windings, and second deadheaded chamber adjacent the throttling chamber and in fluid communication with the external environment through a lubricant orifice. The first deadhead chamber is fluidly isolated from the second deadheaded chamber by the spool for controlling fluid pressure in the throttling chamber.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
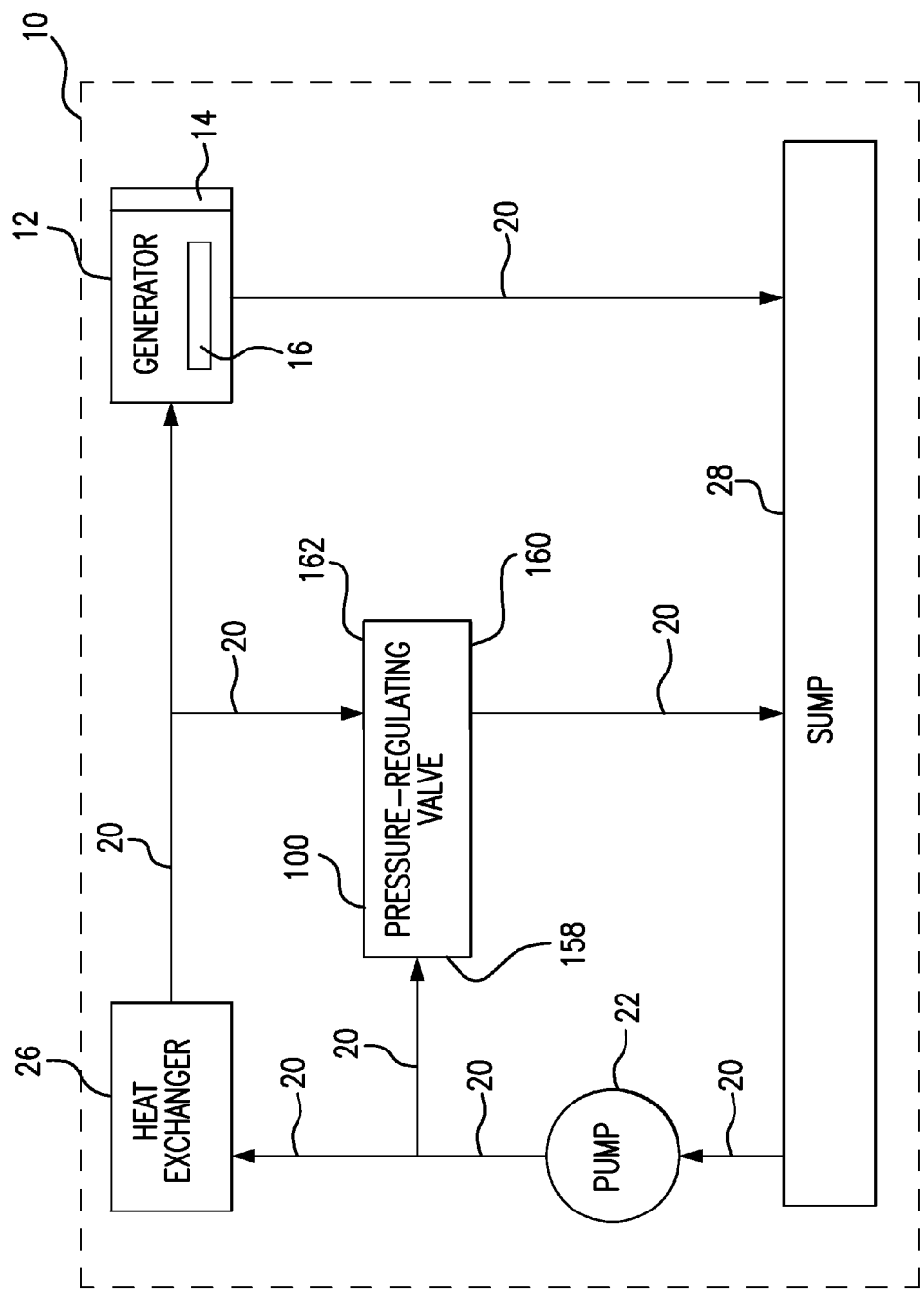
FIG. 1 is a schematic diagram of an exemplary embodiment of an oil circuit constructed in accordance with the present disclosure, showing a generator and pressure regulator valve.

Reference will now be made to the drawings wherein like reference numerals identify similar structural features or aspects of the subject disclosure. For purposes of explanation and illustration, and not limitation, a partial view of an exemplary embodiment of a pressure-regulating valve in accordance with the present disclosure is shown in FIG. 1 and is designated generally by reference character 100. Other embodiments of pressure-regulating valves in accordance with the disclosure, or aspects thereof, are provided in FIGS. 2-4, as will be described. The systems and methods described herein can be used electrical machines, such as generators for providing electrical power on aircraft.

As shown schematically in FIG. 1, aircraft 10 includes an electrical machine 12 and an oil circuit 20. As illustrated, electrical machine 12 is a generator operatively associated with a prime mover 14 configured and adapted for converting rotational energy received from prime mover 14 into electrical energy suitable for use on aircraft 10. Prime mover 14 can be a gas turbine, such as an aircraft main engine or auxiliary power unit. Oil circuit 20 includes a pump 22, a heat exchanger 26, and a pressure-regulating valve 100 interconnects electrical machine 12 with oil sump 28. Oil flow (indicated with arrows) through oil circuit 20 provides oil for cooling windings 16 disposed within electrical machine 12 for removing heat resistively generated within windings 16.

Pump 22 is powered by prime mover 14, typically by way of direct mechanical connection, and draws oil from oil sump 28. Pump 22 supplies oil drawn from oil sump 28 as a pressurized oil flow to heat exchanger 26. Heat exchanger 26 cools the oil and provides the oil as a cooled, pressurized oil flow to electrical machine 12. Electrical machine 12 receives the pressurized, cooled oil and supplies the oil to internal structures requiring lubrication and windings 16, transferring heat from windings 16 and into the oil. Electrical machine 12 thereafter discharges the oil as hot, low-pressure oil to oil sump 28.

Oil pressure can change due to engine speed. This can cause the pressure (or flow) of oil provided heat exchanger 26 to exceed predetermined requirements. Pressure-regulating valve 100 is configured and adapted to maintain oil supplied to electrical machine 12 within predetermined limits by throttling oil flow through oil circuit 20. In particular, pressure-regulating valve 100 selectively redirects a variable portion of oil supplied by pump 22 to heat exchanger 26 according to pressure of a column of oil provided to sense port 162 of pressure-regulating valve 100. Sense port 162 provides an oil reference pressure input to pressure-regulating valve 100. Based on the pressure of oil received at sense port 162 in relation to predetermined pressure limits, pressure-regulating valve 100 changes the amount of oil traversing pressure-regulating valve 100 between an inlet port 158 and an outlet port 160. Increasing this flow drops the pressure of oil supplied to electrical machine 12. Decreasing the flow increases the pressure of oil supplied to electrical machine 12.

Figure 2:
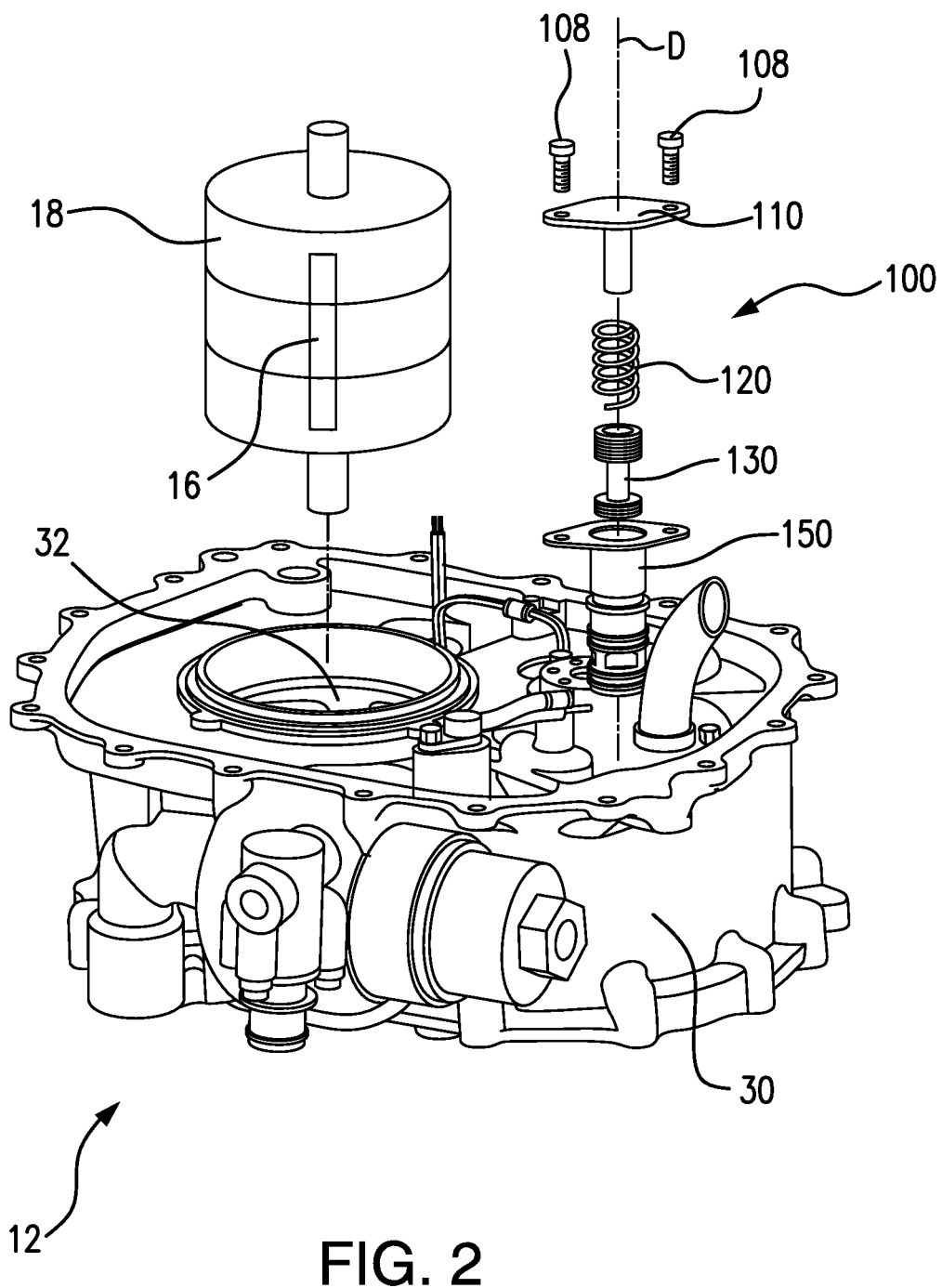
FIG. 2 is an exploded partial view of the generator and pressure-regulating valve of FIG. 1, showing components of the generator and pressure-regulating valve, respectively.

With reference to FIG. 2, electrical machine 12 is shown. Electrical machine 12 includes a housing 30, a rotor 18, and pressure-regulating valve 100. Housing 30 has a bore 32. Rotor 18 carries windings 16 and is received within bore 32. Pressure-regulating valve 100 includes a sleeve body 150, a spool 130, a spring 120, and a cover 110 arranged along a spool displacement axis D. Sleeve body 150 seats within housing 30 and is in fluid communication with both oil circuit 20 (shown in FIG. 1) and components of electrical machine 12 requiring oil. Spool 130 is slideably received within sleeve body 150. Cover 110 seats on an end of sleeve body 150 opposite spool 130. Spring 120 is disposed between cover 110 and spool 130, and is configured and adapted to bias spool 130 in a direction opposite cover 110. Fasteners 108 couple cover 110 to sleeve body 150 and fix pressure-regulating valve 100 within housing 30.

Figure 3:
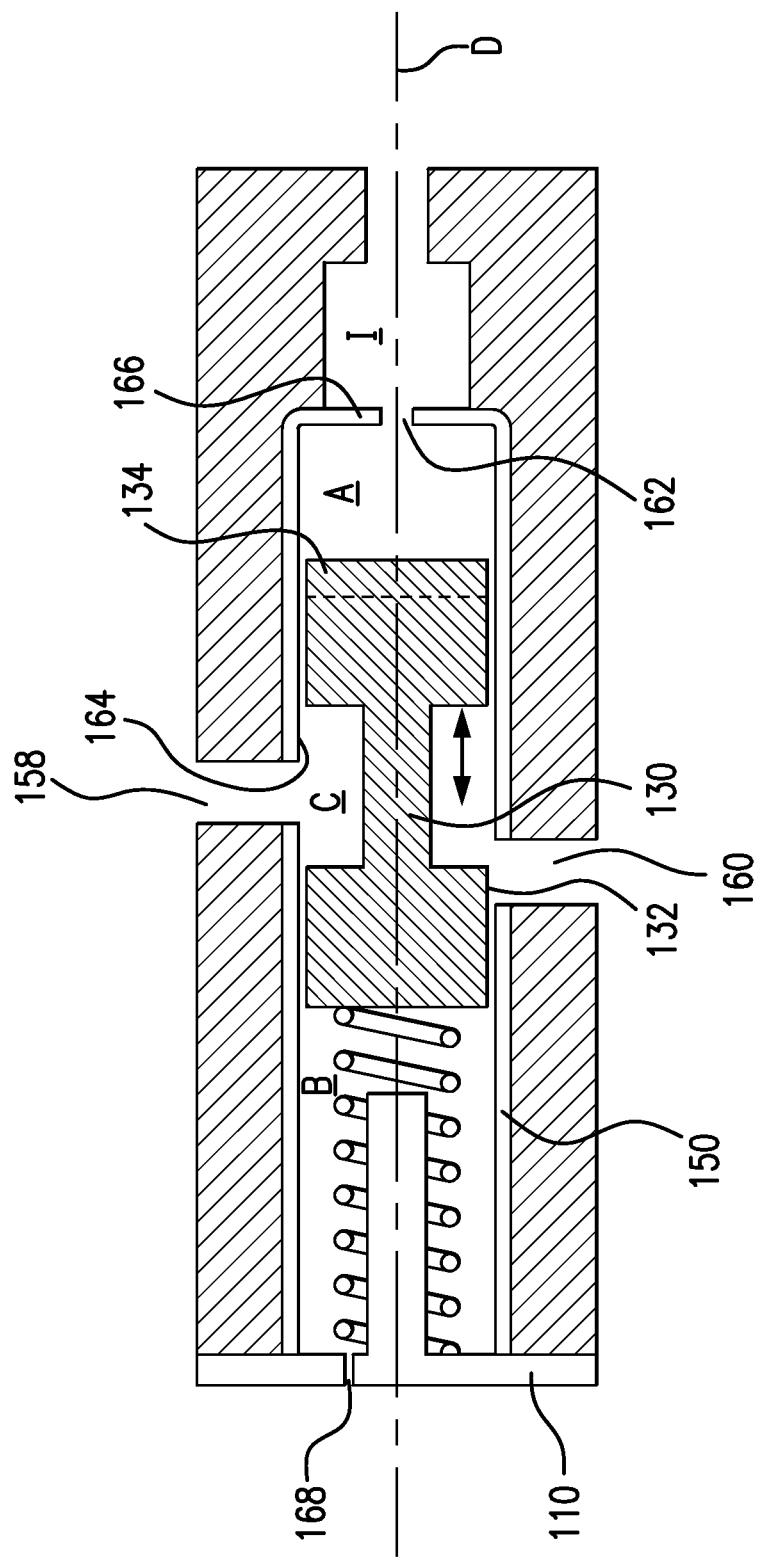
FIG. 3 is a schematic cross-sectional view of the pressure-regulating valve of FIG. 1, showing a solid spool of pressure-regulating valve.

With reference to FIG. 3, pressure-regulating valve 100 is shown schematically. Spool 130 has an external surface 132, a first end facing cover 110, a second end facing sense port 162, a shaft connecting first end to second end, and a disk portion 134 disposed in the second end portion. Sleeve body 150 has an axially extending tubular shape with a aperture on a first end, sense port 162 on a second end, an inlet port 158, and an outlet port 160 laterally opposing inlet port 158. Spool 130 is slideably received within sleeve body 150 such that a periphery of spool 130 sealably engages an interior surface 164 of sleeve body 150. External surface 132 and interior surface 164 defines therebetween a first deadheaded chamber A, a second deadheaded chamber B, and a flow-throttling chamber C.

First deadheaded chamber A is in fluid communication with oil circuit 20 through sense port 162. Second deadheaded chamber B houses spring 120 and includes a lubricant orifice for admitting lubricant suitable for smooth movement of spool 130 within sleeve body 150. Spring 120 in turn biases spool 130 toward sense port 162, i.e. to the right in FIG. 3 as illustrated. Flow-throttling chamber C is defined within sleeve body 150 and is axially disposed between first deadheaded chamber A and second deadheaded chamber B. Flow-throttling chamber C is in fluid communication with oil circuit 20 through inlet port 158 and outlet port 160. Oil selectively traverses flow-throttling chamber C based on the axial position assumed by spool 130, FIG. 3 showing spool 130 partially occluding outlet port 160 and restricting fluid communication therethrough.

Spool 130 includes a disk portion 134, which extends from the center of spool 130 to the spool periphery adjacent sleeve body interior surface 164. As illustrated, disk portion 134 bounds first deadheaded chamber A. This construction enables spool 130 to fluidly isolate first deadheaded chamber A from second deadheaded chamber B, substantially preventing all fluid communication therebetween through pressure-regulating valve 100. Spool 130 also fluidly isolates flow-throttling chamber from both first deadheaded chamber A and second deadheaded chamber B, substantially preventing fluid communication therebetween through pressure-regulating valve 100.

An intermediate chamber I is defined between sense port 162 and housing 30. This allows for first deadheaded chamber A to receive fluid from oil circuit 20 and discharge fluid into oil circuit 20 through sense port 162. The rate of fluid discharge is a function of the flow area defined by sense port 162 and influences the dynamic response of spool 130 to vibrational forces.

Sense port 162 is defined by a flanged portion 166 of sleeve body 150. In the illustrated embodiment, flanged portion 166 defines a sense port flow area with a cylindrical shape along spool displacement axis D. In embodiments, sense port 162 has a width of between about 0.010 inches (0.025 centimeters) and about 0.020 inches (0.050 centimeters). In certain embodiments, the sense port has a width of about 0.015 inches (0.038 centimeters). This provides pressure-regulating valve 100 with relatively high undamped natural frequency for a given sense port size, potentially greater than about 60 hertz for an orifice size of about 0.015 inches (0.038 centimeters) in certain embodiments. Moreover, since entrained air in oil disposed within first deadheaded chamber A tends to have a reduced bulk modulus at lower pressures, direct fluid communication between first deadheaded chamber A and intermediate chamber I can enable the fluid pressure within first deadheaded chamber A to more closely match the valve regulating pressure. This can reduce the impact that entrained air has on the bulk oil modulus and valve performance.

Figure 4:
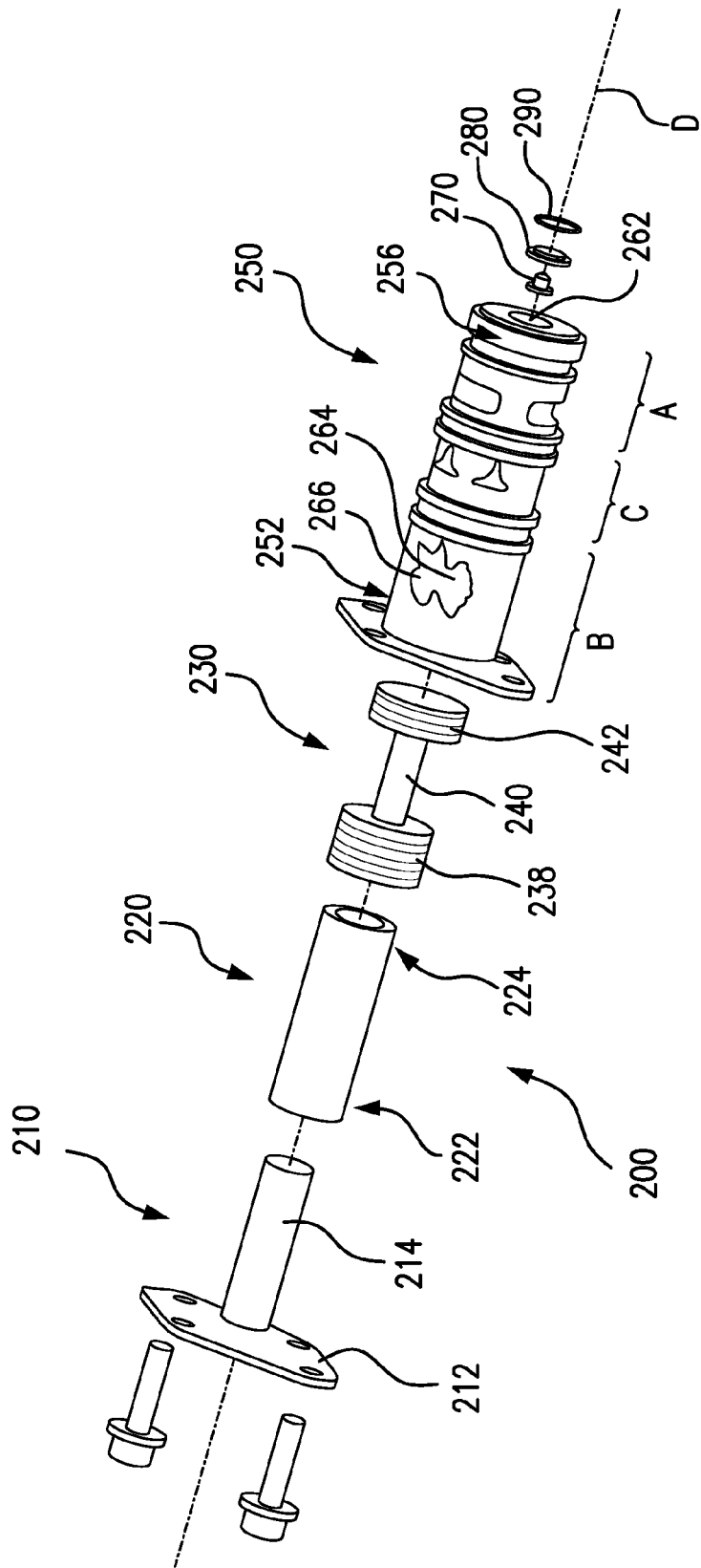
FIG. 4 is an exploded view of an embodiment of the pressure-regulating valve of FIG. 1, showing a debris screen and associated attachment hardware.

With reference to FIG. 4, pressure-regulating valve 200 is shown in an exploded view. Cover 210, spring 220 (shown schematically), spool 230, and sleeve body 250 are disposed along spool displacement axis D. Cover 210 has a flanged portion 212 and a post portion 214 that extends along spool displacement axis D. Spring 220 has a first end 222 that seats about post portion 214 and a second end 224 contacting spool 230. Spring 220 is suitably sized to apply force sufficient to spool 230 to bias spool 230 along spool displacement axis D.

Spool 230 is slideably received within interior 266 of sleeve body 150 and movable along spool displacement axis D. Second end 224 of spring 220 seats with spring-receiving recess 238 and first end 222 seats about post portion 214 of cover 210. Cover 210 seats within flanged first end 252 such that spring 220 sits between cover 210 and spool 230. Since spool 230 is movable within interior 266, spring 220 biases spool 230 within sleeve body 250 along spool displacement axis D toward reference sense port 262. Spool 230 is slideably received within sleeve body 250 such that the external surface 240 of spool 230 and interior surface 264 of sleeve body 250 define therebetween a plurality of sleeve body chambers. In the illustrated embodiment, the plurality of sleeve body chambers include a first deadheaded chamber A, a second deadheaded chamber B, and a flow-throttling chamber C.

First deadheaded chamber A is disposed within interior 166 adjacent to second end 256 of sleeve body 250. First deadheaded chamber A is bounded by a portion of interior surface 264 and orifice face 244 (shown in FIG. 3), and is in fluid communication with the environment external, e.g. oil circuit 20 (shown in FIG. 1) to sleeve body 250 through sense port 262. Second deadheaded chamber B is bounded by a portion of interior surface 264 and by recess 238. Flow throttling chamber C is arranged axially between first deadheaded chamber A and second deadheaded chamber B and is bounded by a portion of interior surface 264.

Contiguous disk portion 242 extends from the center of spool 230 to interior surface 264. This fluidly isolates first deadheaded chamber A from second deadheaded chamber B, substantially preventing fluid communication therebetween through pressure-regulating valve 100. In embodiments, first end 232 similarly extends from the center of spool 230, e.g. spool displacement axis D, to interior surface 264. This fluidly isolates second deadheaded chamber B from flow-throttling chamber C, substantially preventing fluid communication from second deadheaded chamber B into flow-throttling chamber C through pressure-regulating valve 200.

A screen 270, a keeper 280, and a retaining ring 290 are disposed along spool displacement axis D and connected to sleeve body 250. Screen 270 has a wire mesh body having openings suitable sized to prevent particles from traversing sense port 262. Screen 270 is arranged outside of sleeve body 150 axially adjacent to sense port 262. Keeper 280 is disposed about a radial periphery of screen 270 axially adjacent to screen 270 and affixes screen 270 to sleeve body 250. Retaining ring 290 seats over keeper 280 axially adjacent to keeper 280, thereby fixing both keeper 280 and screen 270 against sleeve body 250. This prevents entrained debris from entering first deadheaded chamber A while permitting oil into the chamber through sense port 262.

In embodiments, pressure-regulating valves described herein can provide sense-side damping with relatively high damping chamber pressure. This can mitigate influence the affect that oil aeration can otherwise have on valve performance. In certain embodiments, the relatively large volume of oil displacement per unit stroke of spool 130 further increases the damping effectiveness of pressure-regulating valve 100. It is contemplated that embodiments of pressure-regulating valve 100 can have undamped natural frequencies greater than conventional pressure-regulating valves, and in certain embodiments can have undamped natural frequencies above 60 hertz.

The methods and systems of the present disclosure, as described above and shown in the drawings, provide for pressure-regulating valves with superior properties including improved damping performance for a given sense port flow area size. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A pressure-regulating valve assembly, comprising:
   a sleeve body with a sense port and an interior surface; and
   a spool with a surface slideably received within the sleeve body, wherein the spool surface and sleeve body interior surface define therebetween a plurality of sleeve body chambers,
   wherein a first of the sleeve body chambers is a deadheaded chamber in fluid communication with the environment external to the sleeve body through the sense port for controlling pressure of fluid traversing the sleeve body,
   wherein the deadheaded chamber is a first deadheaded chamber, and wherein the sleeve body includes a second deadheaded chamber, and
   wherein the second deadheaded chamber is fluidly isolated from the first deadheaded chamber by the spool.

2. The valve assembly as recited in claim 1, wherein the second deadheaded chamber is in fluid communication with the environment external to the sleeve body through a lubricant orifice.

3. The valve assembly as recited in claim 1, wherein the plurality of chambers includes a flow-throttling chamber between the first and second deadheaded chambers.

4. The valve assembly as recited in claim 1, wherein the sense port is defined by a flange extending radially inward from the sleeve body.

5. The valve assembly as recited in claim 1, wherein the sense port is disposed radially inward from the periphery of the sleeve body.

6. The valve assembly as recited in claim 1, wherein the sense port defines a cylindrical flow area extending along an axis of the sleeve body.

7. The valve assembly as recited in claim 1, wherein the sense port defines a flow area with a width of between about 0.010 inches (0.025 centimeters) and about 0.020 inches (0.050 centimeters).

8. A pressure-regulating valve assembly, comprising:
   a sleeve body with a sense port and an interior surface; and
   a spool with a surface slideably received within the sleeve body, wherein the spool surface and sleeve body interior surface define therebetween a plurality of sleeve body chambers,
   wherein a first of the sleeve body chambers is a deadheaded chamber in fluid communication with the environment external to the sleeve body through the sense port for controlling pressure of fluid traversing the sleeve body,
wherein the spool includes a disk portion extending from a spool displacement axis to the sleeve body interior surface.

9. The valve assembly as recited in claim 8, wherein the disk potion bounds a portion of the first deadheaded chamber on a side of the chamber opposite the sense port.

10. A pressure-regulating valve assembly, comprising:
a sleeve body with a sense port and an interior surface;
a spool with a surface slideably received within the sleeve body, wherein the spool surface and sleeve body interior surface define therebetween a plurality of sleeve body chambers,
wherein a first of the sleeve body chambers is a deadheaded chamber in fluid communication with the environment external to the sleeve body through the sense port for controlling pressure of fluid traversing the sleeve body;
a screen disposed between the sense port and the environment external to the sleeve body; and
a keeper seated over a periphery of the screen and adjacent to the sleeve body.

11. The valve assembly as recited in claim 10, further including a retaining ring seated over the keeper and axially offset from the sleeve body.

12. An electrical machine, comprising:
an electrical machine with windings;
a pressure-regulating valve assembly, including:
a sleeve body with a sense port and an interior surface; and
a spool with a surface slideably received within the sleeve body, wherein the spool surface and sleeve body interior surface define therebetween a plurality of sleeve body chambers; and
wherein a first of the sleeve body chambers is a first deadheaded chamber in fluid communication with the external environment through the sense port,
wherein a second of the sleeve body chambers is a flow-throttling chamber adjacent to the first deadhead chamber and in fluid communication with electrical machine windings,
wherein another of the sleeve body chambers is a second deadheaded chamber adjacent the throttling chamber and in fluid communication with the external environment through a lubricant orifice, and
wherein the first deadhead chamber is fluidly isolated from the second deadheaded chamber by the spool for controlling fluid pressure in the throttling chamber.

13. The generator as recited in claim 12, wherein the spool includes a disk portion extending from a spool displacement axis to the sleeve body interior surface.

14. The generator as recited in claim 12, further comprising a screen disposed between the sense port and the environment external to the sleeve body and a keeper seated over a periphery of the screen and adjacent to the sleeve body.

* * * * *